United States Patent
Nguyen et al.

(10) Patent No.: US 11,392,148 B2
(45) Date of Patent: Jul. 19, 2022

(54) FLOW RATE CONTROL SYSTEM, CONTROL METHOD OF FLOWRATE CONTROL SYSTEM, AND CONTROL PROGRAM OF FLOWRATE CONTROL SYSTEM

(71) Applicant: Fujikin Incorporated, Osaka (JP)

(72) Inventors: Van Tu Nguyen, Osaka (JP); Masafumi Kitano, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 17/190,422

(22) Filed: Mar. 3, 2021

(65) Prior Publication Data

US 2021/0303007 A1 Sep. 30, 2021

(51) Int. Cl.
| | | |
|---|---|---|
| F16K 31/02 | (2006.01) | |
| G05D 7/06 | (2006.01) | |
| G01F 1/68 | (2006.01) | |
| G01F 25/10 | (2022.01) | |
| G01F 15/02 | (2006.01) | |
| G01F 15/00 | (2006.01) | |

(52) U.S. Cl.
CPC ............. *G05D 7/0635* (2013.01); *G01F 1/68* (2013.01); *G01F 25/10* (2022.01); *G01F 15/005* (2013.01); *G01F 15/024* (2013.01); *G01F 25/15* (2022.01)

(58) Field of Classification Search
CPC ....... G05D 7/0635; G01F 1/68; G01F 15/024; G01F 15/005; G01F 25/0007; G01F 25/0053; G01F 25/15; G01F 25/10
USPC ................... 137/10, 487.5; 73/204.11, 202.5
See application file for complete search history.

(56) References Cited

U.S. PATENT DOCUMENTS

| | | | | |
|---|---|---|---|---|
| 5,062,446 A | * | 11/1991 | Anderson ............ | G05D 7/0635 137/468 |
| 7,905,139 B2 | * | 3/2011 | Lull ...................... | G01F 1/6847 73/202.5 |
| 8,112,182 B2 | * | 2/2012 | Tokuhisa .............. | G01F 1/6842 700/282 |
| 8,356,623 B2 | * | 1/2013 | Isobe .................... | G01F 1/6842 137/486 |
| 8,499,786 B2 | * | 8/2013 | Zolock ................. | G05D 7/0635 137/487 |
| 11,041,749 B1 | * | 6/2021 | Smirnov ............... | G01F 1/6965 |

(Continued)

FOREIGN PATENT DOCUMENTS

| | | |
|---|---|---|
| JP | 2005-531069 | 10/2005 |
| WO | WO2004/001516 | 12/2003 |

*Primary Examiner* — Minh Q Le
(74) *Attorney, Agent, or Firm* — Chris Mizumoto

(57) ABSTRACT

A flow rate control system including a flow rate controller controlling a flow rate of a fluid supplied to a controlled object to keep a desired flow rate set value is provided, and includes a flow rate sensor, a pressure sensor measuring a pressure of a primary side of the flow rate controller, a PI calibration value determination unit determining a PI calibration value based on at least a physical property coefficient according to a physical property value of the fluid, a correction unit correcting an estimated flow rate, based on the PI calibration value and a measured value, and a drive control circuit adjusting an opening of a valve supplying the fluid to the controlled object based on the estimated value and controlling the flow rate of the fluid. A flow rate is accurately calculated regardless of types of a fluid in the pressure insensitive type flow rate controller.

8 Claims, 8 Drawing Sheets

(56) References Cited

U.S. PATENT DOCUMENTS

| | | | |
|---|---|---|---|
| 2008/0140260 A1* | 6/2008 | Ding | G01F 1/68 700/282 |
| 2009/0248213 A1* | 10/2009 | Gotoh | G05D 7/0635 700/282 |
| 2009/0312876 A1* | 12/2009 | Yoneda | G05D 7/0635 700/282 |
| 2010/0000608 A1* | 1/2010 | Goto | G01F 25/15 137/455 |
| 2011/0125445 A1* | 5/2011 | Ebi | G01F 1/6965 702/100 |
| 2013/0092257 A1* | 4/2013 | Yasuda | G05D 7/06 137/487 |
| 2013/0146148 A1* | 6/2013 | Smirnov | F17D 1/16 137/13 |
| 2014/0246097 A1* | 9/2014 | Smirnov | G05D 7/0635 137/10 |
| 2015/0039140 A1* | 2/2015 | Ellec | G05D 7/0635 700/282 |
| 2015/0212524 A1* | 7/2015 | Kehoe | G05D 7/0635 137/15.01 |
| 2015/0369378 A1* | 12/2015 | Umeyama | G05D 7/0635 137/486 |
| 2019/0354120 A1* | 11/2019 | Takijiri | F16K 31/007 |
| 2019/0384330 A1* | 12/2019 | Ando | G05D 7/0635 |
| 2020/0133313 A1* | 4/2020 | Sipka | G05B 23/0221 |
| 2021/0003438 A1* | 1/2021 | Okano | G01F 1/69 |
| 2021/0064067 A1* | 3/2021 | Smirnov | G05D 7/0623 |

* cited by examiner

FLOW RATE CONTROL SYSTEM, CONTROL METHOD OF FLOWRATE CONTROL SYSTEM, AND CONTROL PROGRAM OF FLOWRATE CONTROL SYSTEM

CROSS-REFERENCE

This application claims priority to Japanese Application No. 2020-053123, filed on Mar. 24, 2020.

TECHNICAL FIELD

The present invention relates to a flow rate control system, and control methods and control programs thereof.

BACKGROUND ART

Conventionally, a film forming process, for forming a thin film on a surface of a semiconductor wafer, has been required to achieve a finer thin film. In this context, recently, a film forming method, known as Atomic Layer Deposition (ALD), capable of forming a thin film with a thickness at an atomic level or a molecular level has been employed. With the microfabrication of thin films, higher precision of flow control devices is required.

In a device in which a plurality of flow rate controllers connected to the same line arranged in parallel, a pressure insensitive type flow rate controller (PIMFC: Pressure Insensitive Mass Flow Controller), controlling a flow rate by using a measured value of a pressure sensor provided on a primary side and removing an influence of a primary pressure fluctuation due to a pulsation of another flow rate controller, is known.

Patent Document 1 discloses a method for pressure fluctuation insensitive mass flow control by using a mass flow controller which includes a thermal mass flow sensor in combination with a pressure sensor through providing the pressure sensor between an aperture and a control valve and compensating an inlet flow rate by using a measured pressure.

CITATION LIST

Patent Document

Patent Document 1: JP 2005-531069 A

SUMMARY OF INVENTION

Technical Problem

In a multi gas flow controller, which handles multiple types of gas with one unit, it is desirable that an influence of a primary pressure fluctuation can be appropriately removed regardless of fluid types.

Therefore, one of the objects of the present invention is to accurately obtain a flow rate regardless of fluid types in a flow rate controller of a pressure insensitive type.

Solution to Problem

A flow rate control system according to one aspect of the present invention includes a flow rate controller controlling a flow rate of a fluid supplied to a controlled object to keep a desired flow rate set value. Further, the flow rate control system may include a flow rate sensor measuring the flow rate of the fluid, a pressure sensor measuring a pressure of a primary side of the flow rate controller, a pressure insensitive calibration value determination unit determining a pressure insensitive calibration value based on at least a physical property coefficient according to a physical property value of the fluid, a correction unit correcting an estimated flow rate, estimated by the flow rate sensor, based on the pressure insensitive calibration value and a measured value of the pressure sensor, and a drive control circuit adjusting an opening of a valve supplying the fluid to the controlled object based on the estimated value corrected by the correction unit and controlling the flow rate of the fluid to be the flow rate set value.

Further, the pressure insensitive calibration value determination unit may determine the pressure insensitive calibration value based on at least the physical property coefficient of the fluid and a physical property coefficient according to a physical property value of a reference gas.

Further, the flow rate control system may further include a physical property acquisition unit acquiring the physical property coefficient of the fluid, and a storage storing the pressure insensitive calibration value used for the correction in the flow rate controller. In addition, the pressure insensitive calibration value stored in the storage may be possible to be changed in accordance with acquired physical property coefficient of the fluid.

Further, the pressure insensitive calibration value determination unit may refer to a calibration value table where types of the fluid and the pressure insensitive calibration value are associated with each other and determine the pressure insensitive calibration value stored in the storage.

Further, the flow rate control system may further include a range changing unit changing a measurement range of the flow rate measured by the flow rate sensor.

Further, the pressure insensitive calibration value determination unit may determine the pressure insensitive calibration value based on an eigenvalue of the sensor according to types of the flow rate sensor.

Further, the flow rate sensor may be a thermal mass flow sensor.

A control method of a flow rate control system according to another aspect of the present invention may include a flow rate controller controlling a flow rate of a fluid supplied to a controlled object to keep a desired flow rate set value. Then, the flow rate controller may include a flow rate sensor measuring the flow rate of the fluid, and a pressure sensor measuring a pressure of a primary side of the flow rate controller. Further, the control method of a flow rate control system may include steps of determining a pressure insensitive calibration value based on at least a physical property coefficient according to a physical property value of the fluid, correcting an estimated flow rate, estimated by the flow rate sensor, based on the pressure insensitive calibration value and a measured value of the pressure sensor, and adjusting an opening of a valve supplying the fluid to the controlled object based on the estimated value corrected by the correction unit and controlling the flow rate of the fluid to be the flow rate set value.

A non-transitory computer-readable storage medium according to another aspect of the present invention that stores a computer-executable program for controlling a flow rate control system including a flow rate controller controlling a flow rate of a fluid supplied to a controlled object to keep a desired flow rate set value is provided. The flow rate controller may includes a flow rate sensor measuring the flow rate of the fluid, and a pressure sensor measuring a pressure of a primary side of the flow rate controller. The computer executable program may include instructions for determining a pressure insensitive calibration value based on at least a physical property coefficient according to a physical property value of the fluid, correcting an estimated flow rate, estimated by the flow rate sensor, based on the pressure insensitive calibration value and a measured value of the pressure sensor, and adjusting an opening of a valve supplying the fluid to the controlled object based on the estimated value corrected by the correction unit and controlling the flow rate of the fluid to be the flow rate set value.

The computer executable program can be provided by downloading via a network such as the Internet, or can be recorded and provided on various non-transitory computer readable recording media.

Effect of the Invention

According to the present invention, in a pressure insensitive type flow rate controller, the flow rate can be accurately obtained regardless of the fluid types.

PREFERRED EMBODIMENT

A flow rate control system, its control method and its control program according to embodiments of the present invention will be described below with reference to the drawings.

Overview of the Flow Rate Control System

A flow rate control system 100 is a system to control a flow rate in a controlled object to keep a flow rate set value.

Figure 1:
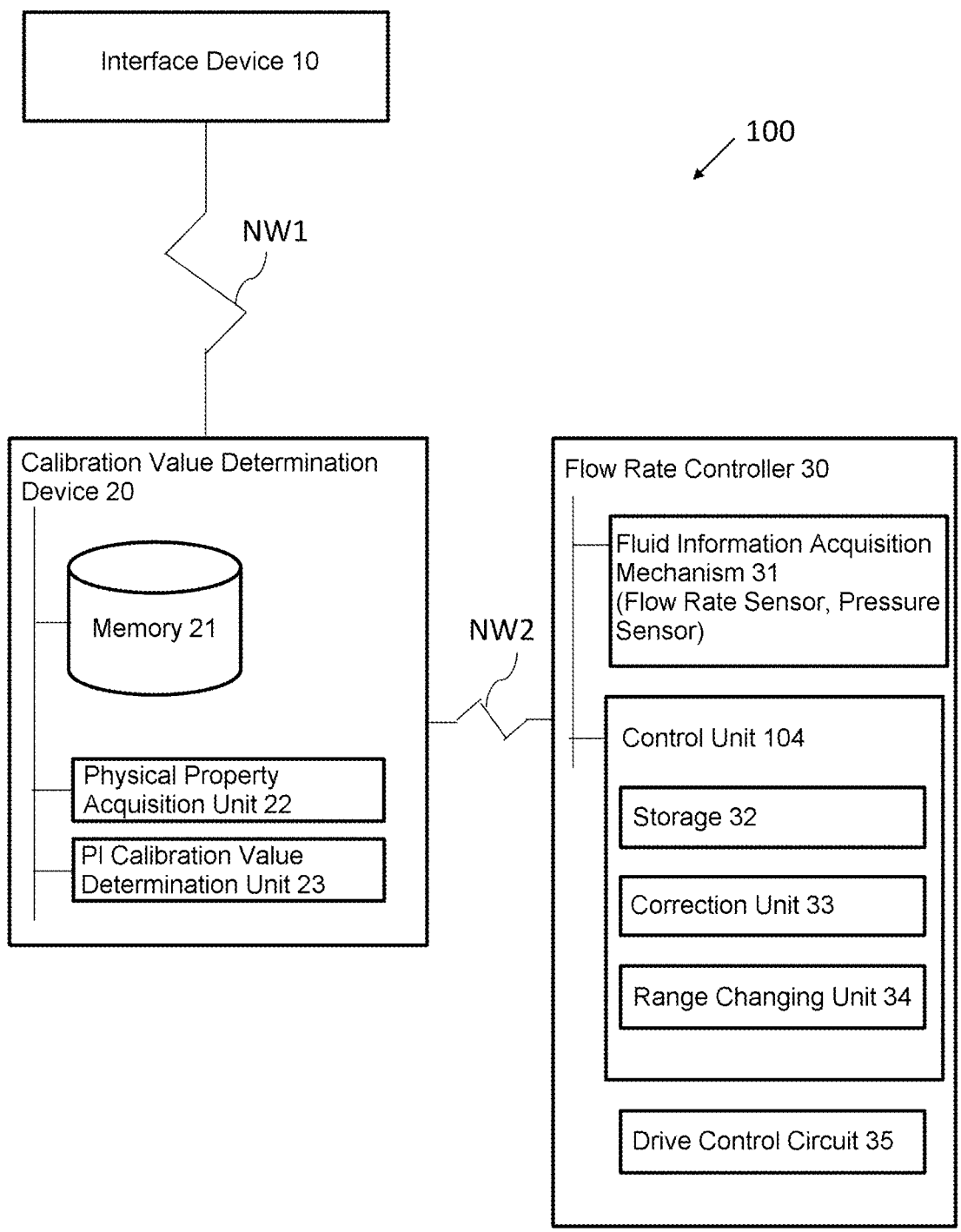
FIG. 1 is illustrating a schematic configuration diagram and a functional block diagram of an interface device, a calibration value determination device, and a flow rate controller, included in the flow rate control system of a first embodiment according to the present invention.

As illustrated in FIG. 1, the flow rate control system 100 is configured by, for example, an interface device 10, a calibration value determination device 20, and a flow rate controller 30, connected to each other through networks NW1, NW2. The networks NW1, NW2 may not be particularly limited as long as a transmission and reception of data are enabled, may be configured by an infrared communication, ZigBee (registered trademark), Bluetooth (registered trademark), LAN (Local Area Network), a predetermined dedicated line, and a communication cable and the like, and do not matter whether they are wired or wireless. In addition, the networks NW1 and NW2 may include those capable of temporarily transmitting and receiving data.

Physical Configurations of the Flow Rate Controller 30

Figure 2:
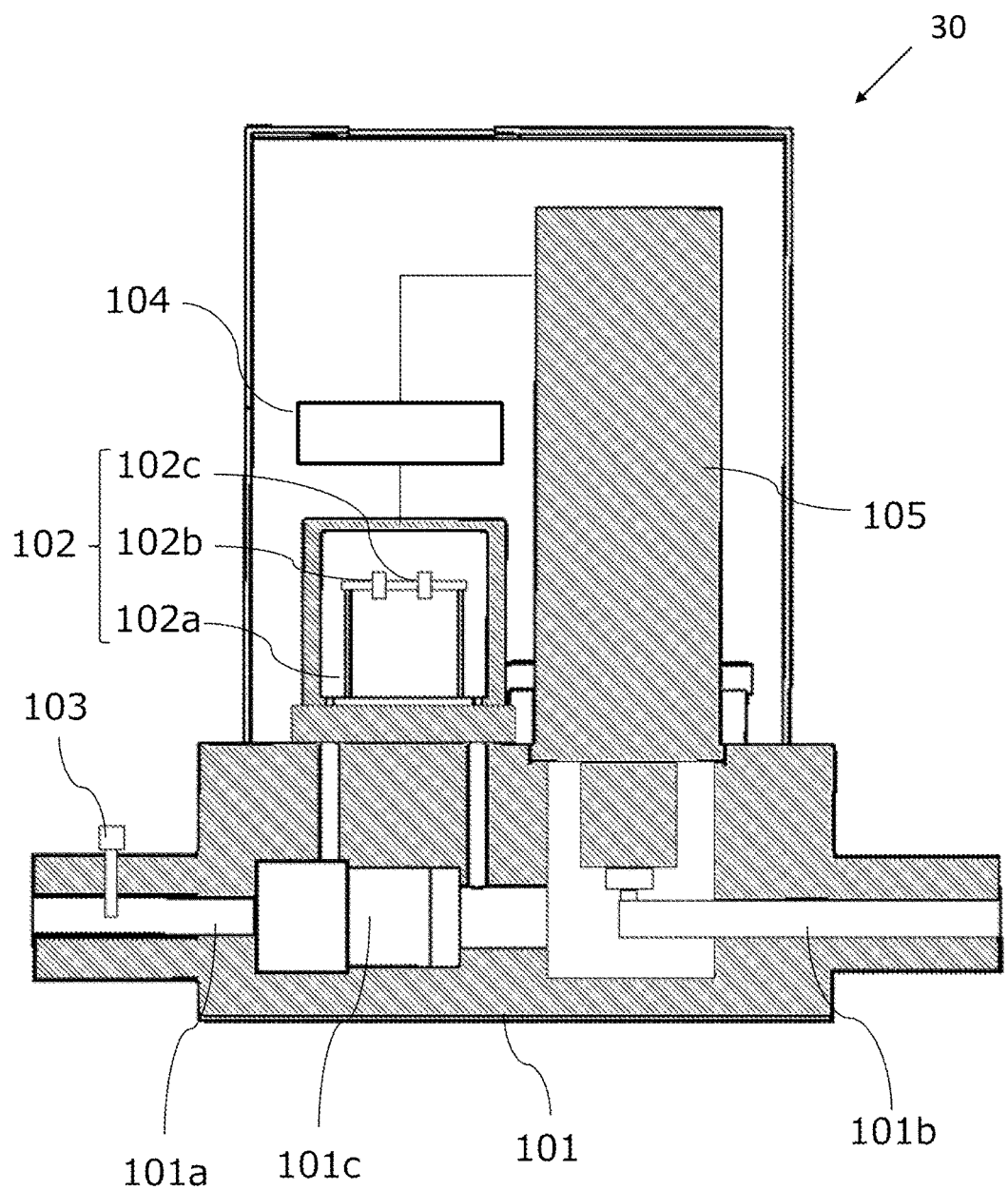
FIG. 2 is a diagram illustrating an overall schematic view of the flow rate controller.

As illustrated in FIG. 2, the flow rate controller 30 includes a valve body 101, a flow rate sensor 102, a pressure sensor 103, a control unit 104, and a valve 105. The flow rate controller 30 is a pressure insensitive flow controller measuring the flow rate of a fluid by the flow rate sensor 102 and corrects the flow rate with a value of the pressure sensor 103 measuring a primary pressure fluctuation.

The valve body 101 is a member made of a steel material such as stainless and having a rectangular parallelopiped outer shape. The valve body 101 is on a supply path of the fluid supplied to the controlled object, and an upstream of the valve body 101 is an upstream flow path 101a and a downstream is a downstream flow path 101b.

An upstream side of the upstream flow path 101a and a downstream side of the downstream flow path 101b are connected to pipes where the fluid of the controlled object flows.

The upstream flow path 101a is a flow path where the fluid flows in from the upstream side. The upstream flow path 101a branches off into flow paths, or a sensor tube 102a and a bypass flow path 101c, passing through the flow rate sensor 102, then merges, and flows out to the valve 105. The valve 105 is a valve body in which an opening position and the like, connecting between the upstream flow path 101a and the downstream flow path 101b, can be controlled, such as a solenoid valve driven by a voice coil. The downstream flow path 101b is configured that a flow-controlled fluid flows in from the upstream side by the valve 105 and flows out to the downstream side of the flow rate controller 30, or to the controlled object.

The flow rate sensor 102 is a sensor measuring the flow rate of the fluid flowing through the sensor tube 102a. The flow rate sensor 102 is, for example, a thermal flow rate sensor having heat-generating resistors 102b, 102c in the upstream and the downstream of the sensor tube 102a, and the flow rate of the fluid flowing in the sensor tube 102a is converted into a voltage based on a temperature difference between the heat-generating resistors 102b, 102c. Since a ratio of the flow rate flowing through the bypass flow path 101c and the flow rate flowing through the sensor tube 102a is known, the flowrate of the upstream flow path 101a can be calculated by measuring the flow rate flowing through the sensor tube 102a.

The pressure sensor 103 is a sensor arranged in the upstream flow path 101a and is measuring a pressure on a primary side of the flow rate controller 30.

When the same fluid flows into multiple lines, a pressure on the primary side fluctuates greatly due to an influence of a pulsation of different flow rate controllers in parallel. This primary pressure fluctuation causes an error in the measured value of the flow rate sensor 102. Therefore, in the flow rate controller 30, the pressure sensor 103 measuring the pressure on the primary side is arranged, the measured value of the flow rate sensor 102 is corrected based on the measured value of the pressure sensor 103, and an effect of a sudden primary pressure fluctuation due to the pulsation of other flow rate controllers can be suppressed.

The control unit 104 is a device to acquire the flow rate set value and to control the valve 105 based on the measured value of the flow rate sensor 102 and the flow rate set value, and is configured, for example, by an electric board. The control unit 104 has a wired or wireless connection to an external flow rate setting device and may acquire the flow rate set value from the external flow rate setting device. The control unit 104 controls an opening position of the valve 105 so that the flow rate discharged from the downstream flow path 101b becomes the flow rate set value.

Interface Device 10

As illustrated in FIG. 1, the interface device 10 is a terminal operated by an administrator of the flow rate control system 100, for example, a personal computer. The interface device 10 receives input such as a type of a live gas or an information related to a physical property value and a type of the flow rate sensor 102 included in the flow rate controller 30. Further, the interface device 10 has a display unit and an input information and an information of a current flow rate are displayed.

Calibration Value Determination Device 20

The calibration value determination device 20 is a functional unit to determine a PI (pressure insensitive) calibration value to calibrate a degree of a calibration value of the flow rate sensor 102 by the pressure sensor 103 based on a physical property coefficient according to the physical property value of a controlled fluid actually used, such as the live gas. The calibration value determination device 20 includes a memory 21, a physical property acquisition unit 22, and a PI (pressure insensitive) calibration value determination unit 23.

The memory 21 is a functional unit that stores data needed to determine the PI calibration value. The memory 21, for example, stores a physical coefficient table in which fluid types are associated with physical property coefficients. The memory 21, in addition to or in place of these, may store a calibration value table in which the fluid types and PI (pressure insensitive) calibration values are associated with each other. Further, the memory 21 stores a physical property coefficient of a reference gas, which is a basis for calculating the PI calibration value, and a PI calibration value of the reference gas. The reference gas is, for example, nitrogen gas.

The physical property acquisition unit 22 is a functional unit that acquires the physical property coefficient of the fluid, which is a controlled object. The physical property coefficient is a coefficient calculated for each types of fluid based on one or more physical property values of the fluid. The physical property acquisition unit 22 may calculate the physical property coefficient based on, for example, the physical properties of the fluid input to the interface device 10. Further, the physical property acquisition unit 22 may refer to the physical coefficient table stored in the memory 21 and acquire the physical property coefficient based on the fluid type input to the interface 10.

The PI calibration value determination unit 23 is a functional unit that determines the PI calibration value based on at least the physical property coefficient according to the physical property value of the fluid.

The PI calibration value determination unit 23 may calculate a PI (pressure insensitive) calibration value PIgas of a controlled object of the fluid, such as a live gas, by using at least a physical property coefficient Qgas of the live gas and a physical property coefficient according to a physical property value of the reference gas. Further, the PI calibration value determination unit 23 determines the PI calibration value based on an eigenvalue of the sensor M according to types of the flow rate sensor. That is, when the reference gas is nitrogen gas, it is expressed by the following equation:

$$PI_{gas}=f(Q_{N_2},Q_{gas},PI_{N_2},M) \quad \text{(Formula 1)}$$

Here, QN2 is a physical property coefficient of the nitrogen gas and PIN2 is a PI calibration value of the nitrogen gas. According to this configuration, the PI calibration value can be obtained without actually flowing the live gas and adjusting it, and the flow rate control can be easily and accurately achieved.

Further, the PI calibration value determination unit 23 may acquire a flow rate correction coefficient (conversion factor) CF of the live gas with respect to the nitrogen gas and calculate the PI calibration value by the following equation based on the flow rate correction coefficient CF:

$$PI_{gas}=g(CF,PI_{N_2},M) \quad \text{(Formula 2)}$$

Further, the PI calibration value determination unit 23 may refer to the calibration value table in which the fluid type and the PI calibration value are associated with each other and may determine the PI calibration value stored in a storage 32, described later and included in the flow rate controller, based on the fluid type input to the interface device 10. According to this configuration, a processing load of a calculation is reduced.

The PI calibration value determination unit 23 transmits a determined PI calibration value to the flow rate controller 30 via a network NW2 and the storage 32 stores this determined PI calibration value.

Internal Circuit Configuration of the Flow Rate Controller

As illustrated in FIG. 1, the flow rate controller 30 mainly includes a fluid information acquisition mechanism 31, the control unit 104, and a drive control circuit 35.

The fluid information acquisition mechanism 31 is a functional unit that acquires the measured value of the flow rate sensor 102 and the pressure sensor 103.

The control unit 104 is a device that acquires a flow rate set value from a flow rate setting device, the measured value of the flow rate and the measured value of the pressure sensor 103, and outputs a signal referred to by the drive control circuit 35 to control drive of the valve 105, and it is, for example, a CPU (Central Processing Unit). A signal measured by the flow rate sensor 102 may be input to the control unit 104 via a sensor circuit for amplifying and filtering, an A/D conversion circuit for digitizing, and the like. An output signal from the control unit 104 may be analogized via a D/A conversion circuit and input to the drive control circuit 35. The drive control circuit 35 controls the valve 105 in response to a signal from the control unit 104.

Functional Block of the Control Unit 104

The control unit 104 includes at least the storage 32, a correction unit 33 and a range changing unit 34 as software resources.

The storage 32 is a functional unit that stores the PI calibration value determined by the calibration value determination device 20. The storage 32 includes a memory and the like in which recorded contents can be overwritten. In other words, the PI calibration value stored in the storage 32 is able to be changed. According to this configuration, even in a multi-gas compatible flow rate control system in which the fluid type is changed, the flow rate can be controlled by using an appropriate PI (pressure insensitive) calibration value without communicating each time with the calibration value determination device 20.

The correction unit 33 is a functional unit that calibrates the measured value of the flow rate sensor 102 based on the measured value and the PI calibration value of the pressure sensor 103. The correction unit 33 calibrates based on the measured value of the pressure sensor 103 in a transient state after the flow rate set value of this flow rate controller 30 or a flow rate controller 30 arranged in parallel changes. This is because when the flow rate set value changes, a primary pressure fluctuation becomes large and an measurement error of the flow rate sensor 102 due to a pressure fluctuation becomes large.

Since the correction unit 33 refers to the PI calibration value stored in the storage 32 to calibrate, it is not necessary to communicate with the calibration value determination device 20 every time a correction process is performed, and the communication load is small. Based on an estimated flow rate generated by the correction unit 33, the drive control circuit 35 controls the drive of the valve 105 so that the estimated flow rate becomes the flow rate set value.

The range changing unit 34 is a functional unit that changes a measurement range of the flow rate controller 30. The range changing unit 34 changes the measurement range by changing a digital gain of the measured value of the flow rate sensor 102. According to this configuration, a multi-range flow rate control system can be achieved and a flow rate control in various flow rate ranges is possible.

Figure 7A:
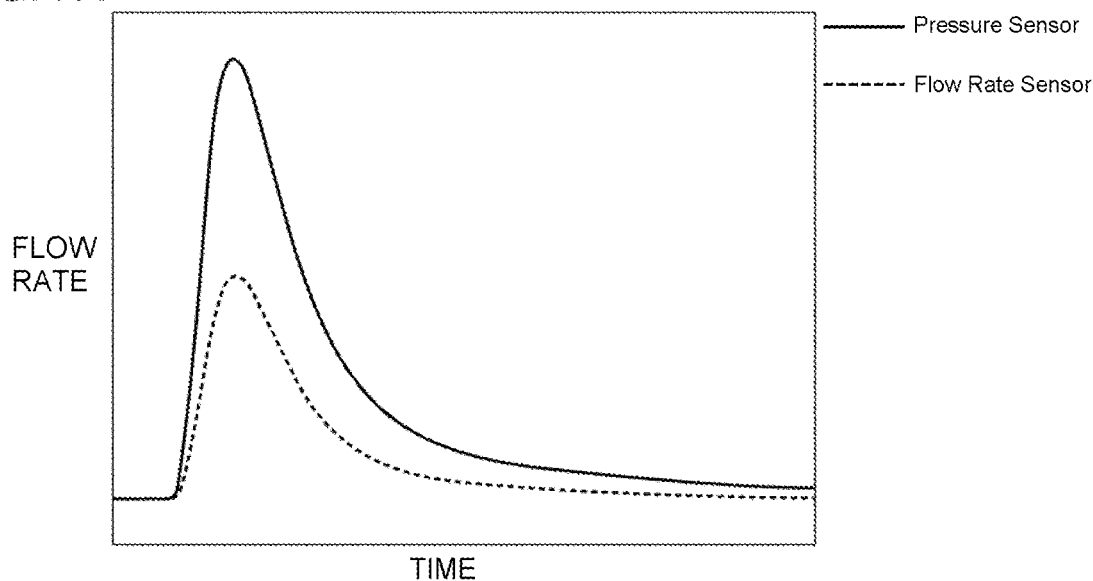
FIG. 7A is a graph illustrating a state of controlling the flow rate by the flow rate controller of a related technology and illustrating an example of the flow rate estimated by the flow rate sensor.
Figure 7B:
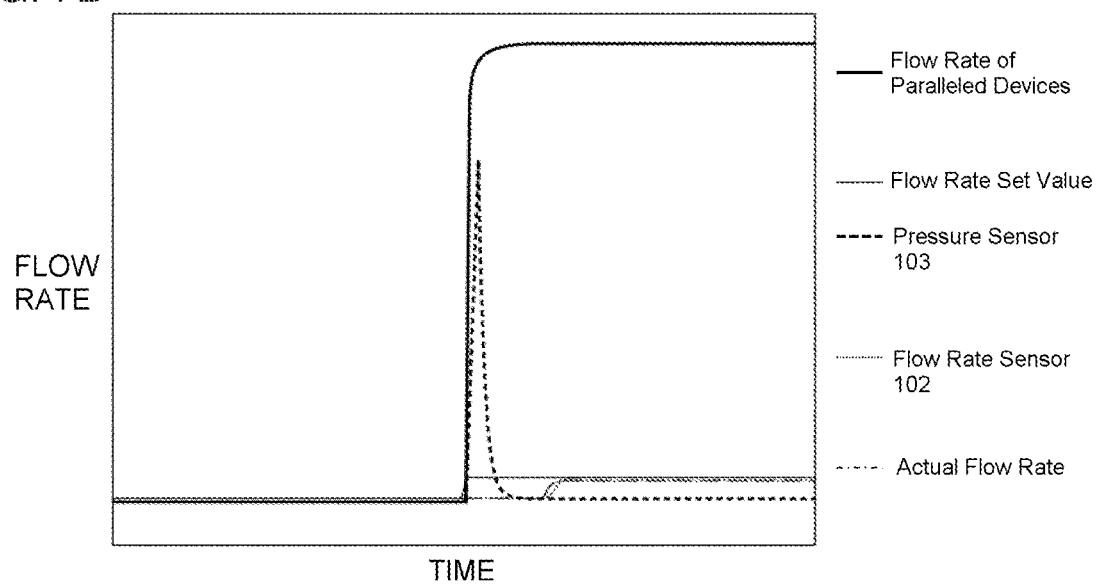
FIG. 7B is a graph illustrating a state of controlling the flow rate by the flow rate controller of a related technology and illustrating a state of being controlled based on the measured value of the flow rate sensor when the flow rate set value is changed.

With reference to FIGS. 3, 7, and 8, a state of control by the flow rate control system 100 according to the present invention will be described. FIG. 7A and FIG. 7B are graphs illustrating the flow rate controller in the related technology and the state of control when the correction by the PI calibration value is not performed. In FIG. 7A, an estimated flow rate by the flow rate sensor 102 is significantly different from an actual flow rate calculated in a separate pressure sensor. As a result, as illustrated in FIG. 7B, the flow rate changes significantly especially in a transient state where the flow rate set value is changed, and it takes time for the flow rate to converge to the flow rate set value.

Figure 8A:
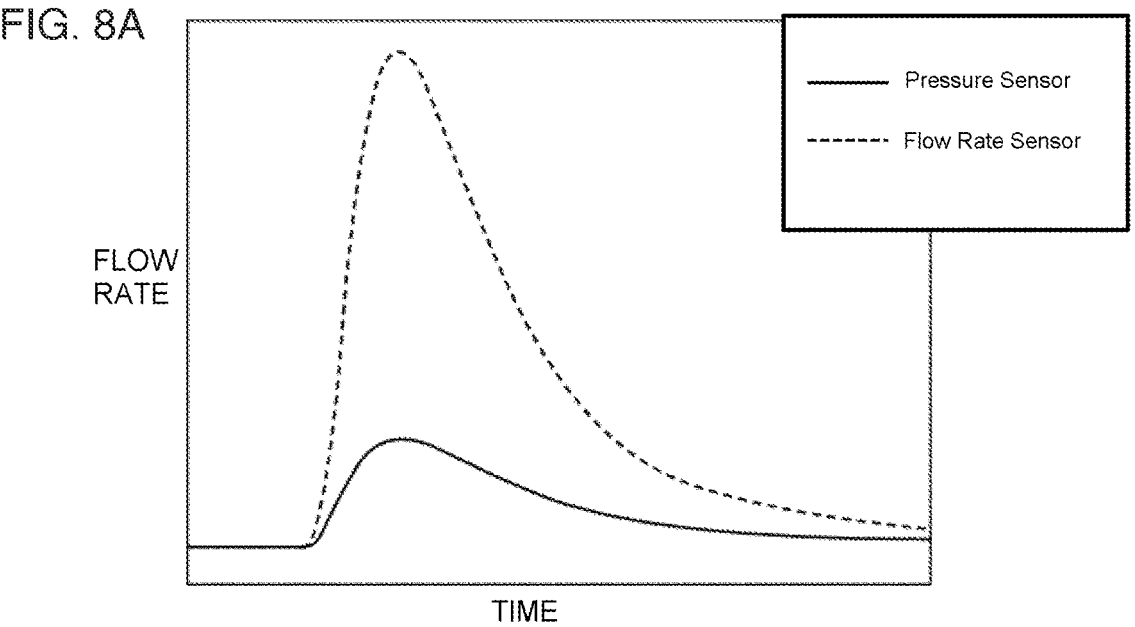
FIG. 8A is a graph illustrating a state of the estimated flow rate based on the flow rate sensor in the flow rate controller of another related technology and illustrating a state when sulfur hexafluoride gas is controlled.
Figure 8B:
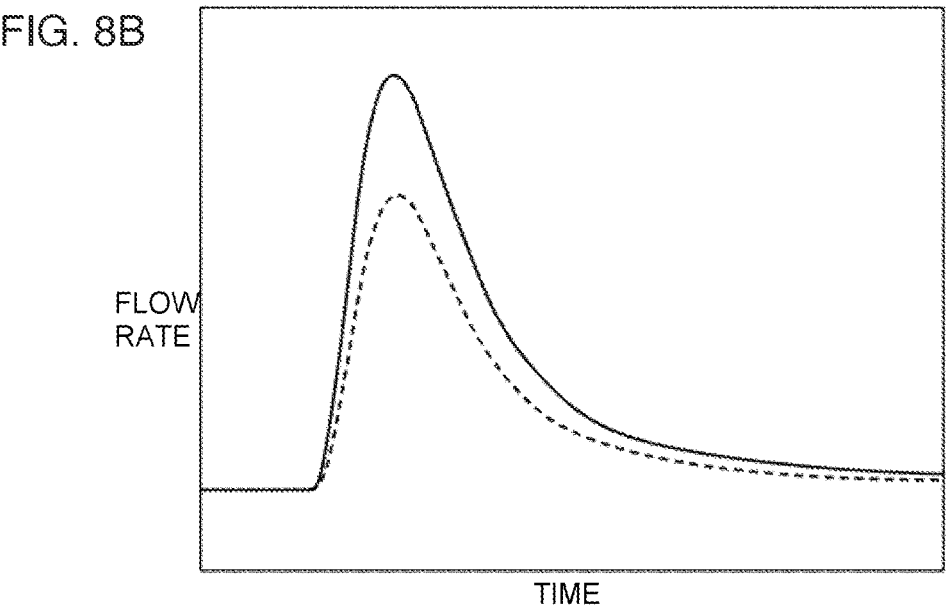
FIG. 8B is a graph illustrating a state of the estimated flow rate based on the flow rate sensor in the flow rate controller of another related technology and illustrating a state when argon gas is controlled.

Further, as illustrated in FIG. 8A and FIG. 8B, regarding a calibration condition of the pressure insensitive type, the PI calibration value is set to a value calculated by nitrogen gas, and if it is not changed according to types of the fluid, or if sulfur hexafluoride gas and argon gas are flowed as the live gas, a value of the flow rate sensor will be significantly different from the actual flow rate.

Figure 3A:
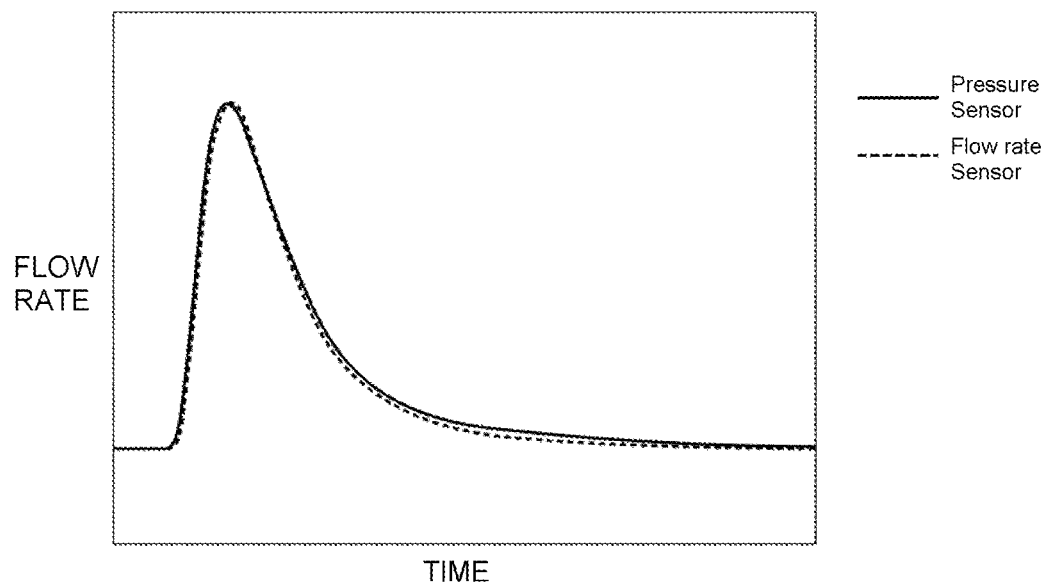
FIG. 3A is a graph illustrating a state in which a flow rate is estimated by the flow rate sensor of the flow rate controller and illustrating a transition of measured value by the pressure sensor and a transition of the estimated flow rate obtained by correcting the measured value of the flow rate sensor by the pressure insensitive calibration value determined by the flow rate control system.
Figure 3B:
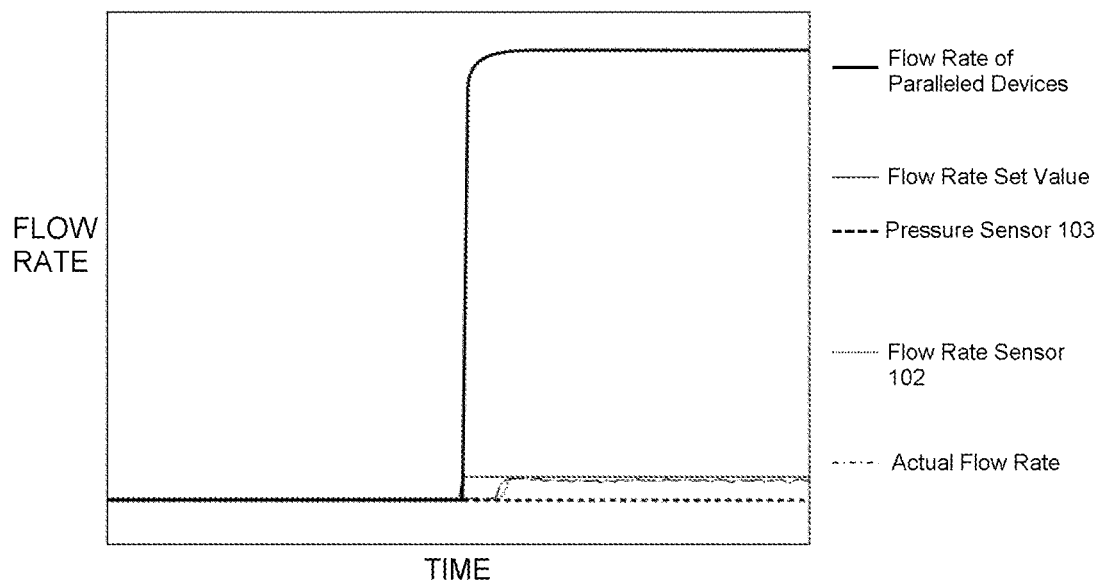
FIG. 3B a graph illustrating a state in which a flow rate is estimated by the flow rate sensor of the flow rate controller and illustrating a state of transition of the flow rate when the flow rate sent value is changed.

FIG. 3A is a graph illustrating a calibrated measured value of the flow rate sensor 102 and an estimated value of the flow rate based on the separate pressure sensor. As illustrated in FIG. 3A, a calibrated estimated flow rate of the flow rate sensor 102 well overlaps with the actual flow rate acquired from the pressure sensor. Further, FIG. 3B is a graph illustrating a state of control when the flow rate set value is changed in a substantially center of the figure. As illustrated in the figure, the flow rate control system 100 can suppress a significant change in the flow rate and quickly and accurately converge the flow rate to the flow rate set value even in the transient state where the flow rate set value is changed.

Figure 6:
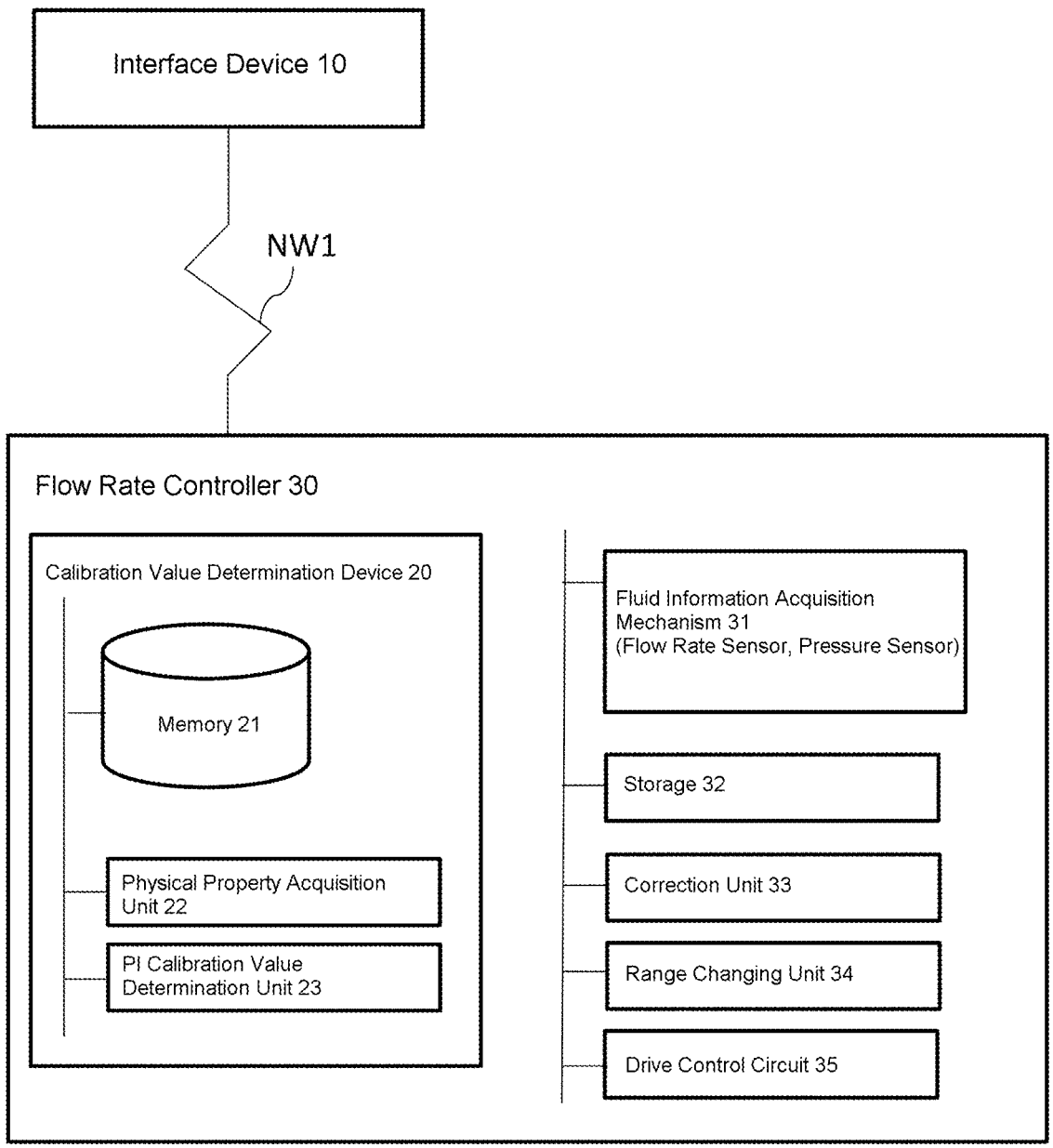
FIG. 6 is an overall schematic view illustrating a second embodiment of the flow rate control system according to the present invention.

In the above-described embodiment, the configuration in which the calibration value determination device 20 and the flow rate controller 30 are connected by the network NW2, but as illustrated in FIG. 6, the flow rate controller itself may include the calibration value determination device 20. According to this configuration, the communication load for changing the PI calibration value is reduced. Further, a part or all of the functions of the calibration value determination device 20 may be provided in the interface device 10.

Flowchart to Determine PI Calibration Value

Figure 4:
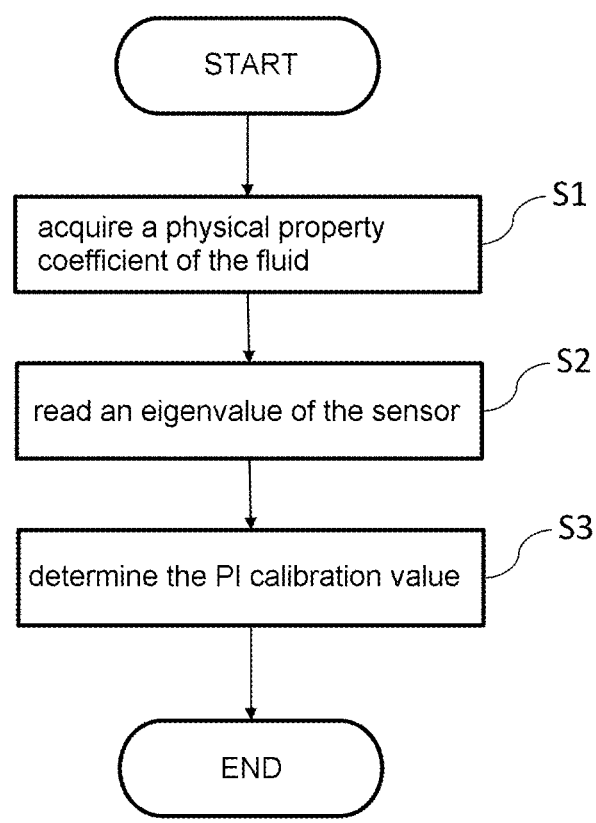
FIG. 4 is a flow chart illustrating that the flow rate control system determines the pressure insensitive calibration value.

As illustrated in FIG. 4, the physical property coefficient of the fluid is acquired (S1). Then, the eigenvalue of the sensor is read (S2), and the PI calibration value is determined based on the physical property coefficient of the fluid, the physical property coefficient of the reference gas, and the eigenvalue of the sensor (S3).

Flowchart to Control the Flow Rate

Figure 5:
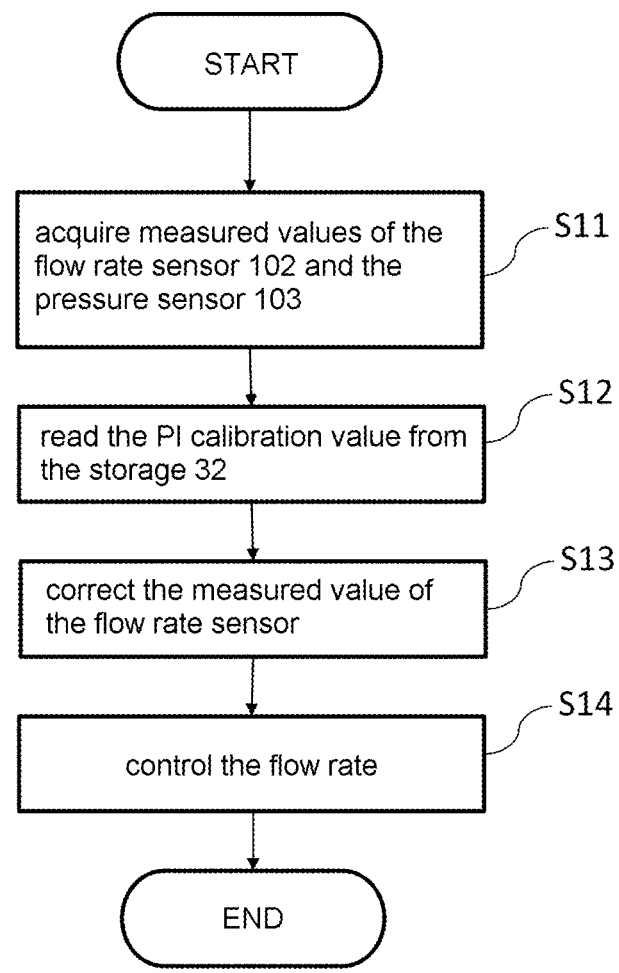
FIG. 5 is a flow chart illustrating that the flow rate control system refers to the pressure insensitive calibration value and corrects the measured value to control the flow rate.

As illustrated in FIG. 5, the measured value of the flow rate sensor 102 and the measured value of the pressure sensor 103 are acquired (S11). Then, the PI calibration value is read from the storage 32 (S12). Based on the read PI calibration value, the measured value of the flow rate sensor 102 is calibrated (S13). Then, based on the calibrated measured value of the flow rate sensor 102 and the measured value of the pressure sensor 103, the flow rate is estimated and the flow rate is controlled (S14). Instead of steps S13 and S14, the flow rate may be estimated based on the PI calibration value, the measured value of the flow rate sensor 102, and the measured value of the pressure sensor 103.

As described above, the flow rate control system according to the present invention may accurately calculate the flow rate in the pressure insensitive type of the flow rate controller regardless of the fluid types.

REFERENCE SIGNS LIST 100 flow rate control system
20 calibration value determination device
23 PI calibration value determination unit
30 flow rate controller
33 correction unit
102 flow rate sensor
103 pressure sensor
105 valve

The invention claimed is:

1. A flow rate control system, including a flow rate controller controlling a flow rate of a fluid supplied to a controlled object to keep a desired flow rate set value, the flow rate control system comprising:
   a flow rate sensor measuring the flow rate of the fluid;
   a pressure sensor measuring a pressure of a primary side of the flow rate controller;
   a pressure insensitive calibration value determination unit determining a pressure insensitive calibration value based on at least a physical property coefficient according to a physical property value of the fluid;

a correction unit correcting an estimated flow rate, estimated by the flow rate sensor, based on the pressure insensitive calibration value and a measured value of the pressure sensor;

a drive control circuit adjusting an opening of a valve supplying the fluid to the controlled object based on the estimated flow rate corrected by the correction unit and controlling the flow rate of the fluid to be the flow rate set value; and a ran edging unit changing a measurement range of the flow rate measured by the flow rate sensor.

2. The flow rate control system according to claim 1, wherein the pressure insensitive calibration value determination unit determines the pressure insensitive calibration value based on at least the physical property coefficient of the fluid and a physical property coefficient according to a physical property value of a reference gas.

3. The flow rate control system according to claim 1, further comprising:

a physical property acquisition unit acquiring the physical property coefficient of the fluid; and a storage storing the pressure insensitive calibration value used for the correction in the flow rate controller;

wherein the pressure insensitive calibration value stored in the storage is possible to be changed in accordance with acquired physical property coefficient of the fluid.

4. The flow rate control system according to claim 3, wherein the pressure insensitive calibration value determination unit refers to a calibration value table where types of the fluid and the pressure insensitive calibration value are associated with each other and determines the pressure insensitive calibration value stored in the storage.

5. The flow rate control system according to claim 1, wherein the pressure insensitive calibration value determination unit determines the pressure insensitive calibration value based on an eigenvalue of the sensor according to types of the flow rate sensor.

6. The flow rate control system according to claim 1, wherein the flow rate sensor is a thermal mass flow sensor.

7. A control method of a flow rate control system including a flow rate controller controlling a flow rate of a fluid supplied to a controlled object to keep a desired flow rate set value, the flow rate controller comprising:

a flow rate sensor measuring the flow rate of the fluid; and a pressure sensor measuring a pressure of a primary side of the flow rate controller; and the method comprising steps of:

determining a pressure insensitive calibration value based on at least a physical property coefficient according to a physical property value of the fluid;

correcting an estimated flow rate, estimated by the flow rate sensor, based on the pressure insensitive calibration value and a measured value of the pressure sensor;

adjusting an opening of a valve supplying the fluid to the controlled object based on the estimated flow rate corrected by the correction unit and controlling the flow rate of the fluid to be the flow rate set value; and changing a measurement range of the flow rate measured by the flow rate sensor.

8. A non-transitory computer-readable storage medium that stores a computer-executable program for controlling a flow rate control system including a flow rate controller controlling a flow rate of a fluid supplied to a controlled object to keep a desired flow rate set value, the flow rate controller comprising:

a flow rate sensor measuring the flow rate of the fluid; and a pressure sensor measuring a pressure of a primary side of the flow rate controller; and the program comprising instructions for:

determining a pressure insensitive calibration value based on at least a physical property coefficient according to a physical property value of the fluid;

correcting an estimated flow rate, estimated by the flow rate sensor, based on the pressure insensitive calibration value and a measured value of the pressure sensor;

adjusting an opening of a valve supplying the fluid to the controlled object based on the estimated flow rate corrected by the correction unit and controlling the flow rate of the fluid to be the flow rate set value; and changing a measurement range of the flow rate measured by the flow rate sensor.

* * * * *